(12) United States Patent
Kokoschka (10) Patent No.: US 10,967,602 B2
(45) Date of Patent: Apr. 6, 2021

(54) SELF-TENSIONING DRUM COVERING FOR A DRIVE DRUM IN A CORRUGATING MACHINE

(71) Applicant: Muehlen Sohn GmbH & Co. KG, Blaustein (DE)

(72) Inventor: Erwin Kokoschka, Blaustein (DE)

(73) Assignee: Muehlen Sohn GmbH & Co. KG, Blaustein (DE)

( * ) Notice: Subject to any disclaimer, the term of this patent is extended or adjusted under 35 U.S.C. 154(b) by 299 days.

(21) Appl. No.: 16/311,402

(22) PCT Filed: Jun. 27, 2016

(86) PCT No.: PCT/DE2016/100291
§ 371 (c)(1),
(2) Date: Dec. 19, 2018

(87) PCT Pub. No.: WO2018/001395
PCT Pub. Date: Jan. 4, 2018

(65) Prior Publication Data
US 2019/0248096 A1 Aug. 15, 2019

(51) Int. Cl.
*B31F 1/28* (2006.01)
*B31F 1/20* (2006.01)
(Continued)

(52) U.S. Cl.
CPC ............ *B31F 1/2877* (2013.01); *B31D 5/006* (2013.01); *B31F 1/20* (2013.01); *B65G 1/02* (2013.01)

(58) Field of Classification Search
CPC .............................. B31F 1/2877; B65G 39/07
See application file for complete search history.

(56) References Cited

U.S. PATENT DOCUMENTS 2,039,750 A 5/1936 Swift, Jr.
3,919,925 A * 11/1975 Hayama ................. B31D 3/005
493/287
(Continued)

FOREIGN PATENT DOCUMENTS

AT 349 984 B 5/1979

OTHER PUBLICATIONS

International Search Report of PCT/DE2016/100291 dated Mar. 15, 2017.
(Continued)

*Primary Examiner* — Thomas Randazzo
(74) *Attorney, Agent, or Firm* — Collard & Roe, P.C.

(57) ABSTRACT

A drum covering for a drive drum (21) in a corrugating machine has a textile carrier material that reversibly shrinks when heated up, said carrier material being coated on at least one side with a coating material. Furthermore, it has two rectangular regions (71, 72) that are each connected to a convexly deltoid-shaped region (6) on a narrow side. Sets for producing the drum covering contain several covering pieces. A drive drum provided with the drum covering can be produced by the central axis (M) of the convexly deltoid-shaped region (6) being arranged along the circumferential central axis of the drive drum (21). Then, the convexly deltoid-shaped region (6) is fixed on the drive drum surface by means of at least one fixing element. The drive drum (21) is rotated, wherein the rectangular regions (71, 72) of the drum covering are wound around the drive drum (21) in a spiral-shaped manner. The rectangular regions (71, 72) are cut off on the ends of the drive drum (21) and the ends of the rectangular regions (71, 72) are fixed on the drive drum surface by means of further fixing elements. This drive drum can be installed in a corrugating machine in such a way that the rectangular regions (71, 72) are wound around the drive
(Continued)

drum against the rotational direction of the drive drum (21) when the corrugating machine is in operation.

18 Claims, 7 Drawing Sheets

(51) Int. Cl.
*B65G 1/02* (2006.01)
*B31D 5/00* (2017.01)

(56) References Cited

U.S. PATENT DOCUMENTS

| | | | | |
|---|---|---|---|---|
| 5,782,735 | A * | 7/1998 | Goodrich | B31D 1/0031 225/100 |
| 2003/0166444 | A1* | 9/2003 | Franchi | B31F 1/2877 493/463 |
| 2017/0313017 | A1* | 11/2017 | Cheich | B31D 5/0069 |
| 2020/0165122 | A1* | 5/2020 | Salzmann | B68G 7/052 |

OTHER PUBLICATIONS

English translation of the International Preliminary Report on Patentability and Written Opinion of the International Searching Authority in PCT/DE2016/100291, dated Jan. 10, 2019.

\* cited by examiner

SELF-TENSIONING DRUM COVERING FOR A DRIVE DRUM IN A CORRUGATING MACHINE

CROSS REFERENCE TO RELATED APPLICATIONS

This application is the National Stage of PCT/DE2016/100291 filed on Jun. 27, 2016, the disclosure of which is incorporated by reference. The international application under PCT article 21(2) was not published in English.

The present invention relates to a self-tensioning drum covering for a drive drum in a corrugating machine. Furthermore, the present invention relates to sets for producing the drum covering. Furthermore, the present invention relates to a drive drum that has the drum covering and a method for producing the drum covering. Finally, the present invention relates to a corrugating machine that contains at least one such drive drum.

PRIOR ART

Corrugating machines have upper belts and lower belts that transport the corrugated cardboard through the corrugating machine. A corrugating machine is known from U.S. Pat. No. 2,039,750, for example. Drive drums are used for force transfer to the upper and lower belts.

In order to guarantee an optimal force transfer from the drive drum to the belt, the drive drums, which are also called drive rollers, are provided with a covering. The result of this is a minimal slip of the belt in order to optimise the force transfer and to minimise the wear of the belts. This increases the economy of the corrugating machine. Drum coverings have a lifetime of three to five years and are usually fixedly adhered on the drive drums. To change the coverings, the drive drums are processed and covered within the production line of the corrugating machine. During these time-consuming tasks, the corrugating machine must be taken out of operation. Moreover, when changing the coverings, significant risk of injury sometimes arises because of the mechanical tasks or even health risks because of the use of adhesives containing solvents.

Alternatively, rubber-coated drive drums can also be used. After the rubber covering is worn away, the whole drum must then be changed.

One object of the present invention is therefore to provide a drum covering that can be applied quickly and with low danger potential onto the drive drum of a corrugating machine and that can then be removed from this. Further objects of the invention are to provide sets from which the drum covering can be produced on the site of the corrugating machine, to provide a drive drum covered with the drum covering and a method for the production thereof, and finally to provide a corrugated machine that has such a drive drum.

DISCLOSURE OF THE INVENTION

This object is solved in one aspect of the invention by a drum covering for a drive drum in a corrugating machine that has a textile carrier material that reversibly shrinks when it heats up, said carrier material being coated on at least one side with a coating material. The drum covering has two rectangular regions that are connected on a narrow side to a convexly deltoid-shaped region.

The drum covering, in particular, does not have an adhesive layer on any side.

The convexly deltoid-shaped region of the drum covering ensures that the rectangular regions of the drum covering form an angle of more than 0° and less than 90° with one another. A convex deltoid is labelled as a kite quadrilateral and has two pairs of equal-length adjacent sides. A diagonal of the convex deltoid at the same time forms its axis of symmetry.

All kinds of textiles can fundamentally be used as the reversibly shrinking carrier material, such as woven fabric, knitted fabric, crocheted fabric, laid fabric, netting or even felt, for example. Here, multi-layered woven fabrics, in particular two-layered or three-layered woven fabrics, are preferred. The textile carrier material can essentially include synthetic and/or natural fibrous materials. Polyester and/or viscose are preferred in order to obtain the thermal shrinking properties. Here, it is further preferred that the textile carrier material contains at least two different fibrous materials.

The coating material fulfils two functions. On the one hand, it prevents the upper belt or lower belt from slipping from a drive drum that is covered with the drum covering. On the other hand, it ensures an optimal force transfer to the upper belt or lower belt of a corrugating machine. The coating material does not fundamentally have to be equipped with thermal shrinking properties. In this case, it is compressed by the thermal shrinking properties of the textile carrier material when the temperature increases. This leads to a thermal shrinking of the whole drum covering. When the temperature increases because of the process in a corrugating machine, the drum covering undergoes a shrinkage that counters the age-related mechanic lengthening of the drum covering. The shrinking of the drum covering caused by temperature tensions the drum covering. When the drum covering cools down, this returns to its original shape because of the reversible shrinking properties. This enables a simple removal of the drum covering from the drive drum.

Preferably, the coating material indeed also reversibly shrinks when the temperature increases. In this way, particularly pronounced thermal shrinking properties of the whole drum covering can be obtained.

In order to prevent the upper belt or the lower belt from slipping from the drive drum and to ensure an optimal force transfer, it is basically sufficient if the textile carrier material is coated on one side with the coating material and this side is facing towards the belt. However, it is preferred that the textile carrier material is coated on both sides with the coating material. This leads on the one hand to more uniform shrinking properties of the drum covering. On the other hand, the second coating that can be facing towards the drive drum reliably prevents the drum covering from slipping on the drive drum.

In a preferred embodiment of the drum covering, different coating materials are applied onto the two sides of the textile carrier material. Here, a coating material with a higher friction coefficient and a higher abrasion resistance is arranged, in particular, on the side of the drum covering that is to face towards a belt, rather than on the side that is to face towards the drive drum. Herewith, the coating materials can be adjusted to the different requirements for the drum covering sides.

The reversibly shrinking textile carrier material and/or the coating material that reversibly shrinks where necessary preferably shrink by at least 0.01% in the longitudinal direction when warmed up by at least 80° C. In doing so, such a pronounced shrinking of the drum covering can be achieved when the temperature increases, as is typical when the corrugating machine is in operation, compared to the temperature of the surroundings, that it can be securely tensioned on a drive drum. The shrinkage of the whole drum covering when the temperature increases by at least 80° C. is also preferably at least 0.01% in the longitudinal direction.

The coating material is preferably selected from the group that consists of rubbers, silicones, polyurethanes and mixtures of these. Silicones, such as polydimethylsiloxane, are more preferred as the coating material. Cross-linked polydimethylsiloxanes are most preferred. Selected representatives of these substance classes have good reversible thermal shrinking properties combined with a high abrasion resistance and a high friction coefficient that prevents the upper belt or the lower belt from slipping on the drum covering.

The combination of the textile carrier material and the coating material is preferably chosen in such a way that the drum covering has a Shore A hardness of more than 50. This can be determined according to the DIN ISO 7619-1 standard. Such a high hardness gives the drum covering a long lifetime when used in a corrugating machine such that changing the drum covering, for which the corrugating machine has to be shut down, is only rarely required.

In order to enable a simple application of the drum covering onto a drive drum, its maximum thickness is preferably 15 mm, more preferably 10 mm. In order to nevertheless ensure a sufficient wear resistance of the drum covering, the thickness of the textile carrier material preferably ranges from 1 mm to 9 mm, more preferably ranging from 4 mm to 7 mm. The coating of the textile carrier material that is provided for a belt-side arrangement has a thickness preferably ranging from 0.1 mm to 3 mm, more preferably ranging from 0.5 mm to 1.5 mm. Furthermore, the width of the rectangular region preferably ranges from 5 cm to 80 cm, more preferably ranging from 10 cm to 20 cm in order to obtain a good coverage of the drum surface with commercially typical drive drum diameters.

In a further aspect, the invention relates to a set for producing the drum covering according to the invention. In one embodiment of this set, it comprises two rectangular covering pieces and a convexly deltoid covering piece. All covering pieces have a textile carrier material that reversibly shrinks when heated up, said carrier material being coated on at least one side by a coating material. The covering pieces can be connected to one another, for example, by means of clamping in order to obtain the drum covering. Here, the rectangular covering pieces form the rectangular regions of the drum covering and the convexly deltoid-shaped covering piece forms the convexly deltoid-shaped region of the drum covering. Such a set has the advantage that it is easy to transport by the rectangular covering pieces being able to be rolled up, which would not be easily possible with the finished drum covering because of the angled positioning of the rectangular regions. When fitting a drive drum of a corrugating machine with the drum covering, the covering pieces of the set can be assembled on the site of the drum covering immediately before covering the drive drum.

In another embodiment of the set, it comprises several triangular covering pieces instead of the convexly deltoid-shaped covering piece, in particular two right-angled triangular covering pieces. The two right-angled triangular covering pieces can form the convexly deltoid-shaped region of the drum covering by being joined on their hypotenuses. While it is necessary to connect the convexly deltoid-shaped covering piece or the right-angled triangular covering pieces in each case fixedly to the rectangular covering pieces in order to obtain the drum covering, it is sufficient to join the two right-angled triangular covering pieces to each other without a fixed connection on the surface without connecting them one under the other. A subsequent fixing of the right-angled triangular covering pieces on the surface of the drive drum fixes these permanently in the convex deltoid shape that is necessary for forming the drum covering. This embodiment of the set enables an even more space-saving stowing of the covering pieces. In particular, it is possible to deliver a right-angled triangular covering piece already in the set that is connected to a corresponding rectangular covering piece without the ability of rolling up of the covering pieces connected in this manner thus being impaired. This connection can therefore also take place in such a way that the right-angled triangular covering piece is formed to be one piece with the corresponding rectangular covering piece.

In yet a further aspect, the invention relates to a drive drum. This has a drum covering that has a textile carrier material that reversibly shrinks when heated up, said material being coated at least on one side with a coating material. Two rectangular regions of the drum covering are wound around the drive drum in a spiral-shaped manner and are fixed on the drive drum surface by fixing elements. In each case, one end of each rectangular region of the drum covering thus borders one side of a convexly deltoid-shaped positioning region of the drive drum, said positioning region being arranged in the middle of the drive drum surface. Here, border is to be understood as a narrow side of the respective rectangular region lying on one side of the deltoid-shaped position region. The positioning region can be covered by further regions of the drum covering. It can, however, also remain free and only define the positioning of the rectangular regions relative to one another.

In particular by covering a conventional drive drum with a drum covering according to the invention, a drive drum according to the invention can be obtained. With this drive drum, the convexly deltoid-shaped region of the drum covering is fixed on the drive drum in the middle of the drive drum surface by means of at least one fixing element. It thus lies in the deltoid-shaped positioning region. The rectangular regions of the drum covering are wound around the drive drum in a spiral-shaped manner and are fixed on their ends in each case to at least one further fixing element on the drive drum surface. By the convexly deltoid-shaped region being arranged exactly in the middle of the drive drum surface, a symmetrical arrangement of the rectangular regions of the drum covering takes place, such that when using the drive drum in a corrugating machine, no unwanted guiding forces emerge. Starting from the drum centre, the rectangular regions of the drum covering form a spiral-shaped groove where their coils are next to one another, with a left or right gradient. Guiding forces locally emerging by means of this are compensated by the symmetry across the entire drive drum. The fixing of the drum covering according to the invention on the drive drum makes adhering the drum covering completely unnecessary. When the drum covering has to be changed because of wear, it is thus sufficient to remove the fixing elements on the ends of the rectangular regions and in the convexly deltoid-shaped region so that the drum covering can subsequently simply be unwound from the drive drum.

An angle α formed by the two longest sides of the convexly deltoid-shaped region of the drum covering results from formula 1:

$$\alpha = 2 \cdot \arcsin\frac{b}{U} \qquad \text{(Formula 1)}$$

Here, b denotes the width of the rectangular regions of the drum covering. U is the circumference of the drive drum. This angle α guarantees the smallest possible groove between the coils of the rectangular regions of the drum covering. Depending on the circumference of the drive drum that is to be covered with the drum covering, an angle α depending on the width of the rectangular regions of the convexly deltoid-shaped region is thus preferably chosen according to formula 1. If the convexly deltoid-shaped region is to be made up of two right-angled triangular covering pieces, then these preferably have, in each case, an angle between their two longest sides that corresponds to half the angle α.

The drum covering is preferably pre-tensioned with a pre-tensioning force ranging from 1 kg to 10 kg, more preferably from 3 kg to 7 kg. Hereby, on the one hand, it is ensured that already at room temperature, i.e. before the corrugating machine begins operation, a sufficient tension of the drum covering is present in order to prevent it from sliding on the surface of the drive drum. On the other hand, the pre-tensioning force is small enough that no excessive mechanical load of the drum covering takes place because of the thermal shrinking of the drum covering.

The at least one fixing element that fixes the convexly deltoid-shaped region of the drum covering on the drive drum is preferably a fixing rivet that is arranged in an elongated hole that passes through the convexly deltoid-shaped region. In particular, a spacer is inserted between the rivet head and the drive drum surface. This enables a mobility of the fixing element when the drum covering thermally shrinks. If the convexly deltoid-shaped region is made up of two right-angled triangular covering pieces, then each of these covering pieces has a separate elongated hole with its own fixing rivet. For a particularly secure fixing of the convexly deltoid-shaped region, several elongated holes can also be provided whose individual longitudinal axes each lie on one common longitudinal axis.

These same fixing rivets that are provided for fixing the convexly deltoid-shaped region can also be used for fixing the ends of the rectangular regions. Here, however, they are preferably not guided through elongated holes, but rather through circular holes in the rectangular regions such that there is no mobility of the fixing rivets on the ends of the rectangular regions. Therefore, spacers are not required in the circular holes.

In order to insert the fixing rivets into the surface of the drive drum, it is necessary that it have bores. These bores can be introduced into the drive drum surface when applying the drum covering on the drive drum on site.

A method for producing the drive drum comprises the following steps:
- arranging the convexly deltoid-shaped region of a drum covering on a drive drum, wherein the central axis of the convexly deltoid-shaped region is arranged along the circumferential central axis of the drive drum,
- fixing the convexly deltoid-shaped region of the drum covering on the drive drum surface by means of at least one fixing element,
- rotating the drive drum, wherein the rectangular regions of the drum covering are wound around the drive drum in a spiral-shaped manner,
- cutting the rectangular regions on the ends of the drive drum, and
- fixing the ends of the rectangular regions on the drive drum surface by means of further fixing elements.

The central axis of the convexly deltoid-shaped region is to be understood here as its longest diagonal. The circumferential central axis of the drive drum is to be understood as the line that is orthogonal on the longitudinal axis of the drive drum and that is arranged equidistant from the two ends of the drive drum. It runs on the outer surface of the drive drum. Rotating the drive drum can take place in its fixing in a corrugating machine such that strengthening and subsequently reinstalling the drive drum into the corrugating machine is not necessary.

While it is necessary, when selecting a drum covering with the ideal angle α of the convexly deltoid-shaped region, to know the circumference of the drive drum in advance, in contrast, knowing its length is not necessary in the same way. When the rectangular regions of the drum covering are implemented to be sufficiently long, then a drum of any usual length can be coated by them. The protruding ends of the rectangular regions are cut off such that tapered sections form on the ends of the rectangular regions, said sections being able to be fixed on the drive drum.

If the convexly deltoid-shaped region is made up of two right-angled triangular regions, then this can take place on the surface of the drive drum. Each right-angled triangular region is thus fixed by at least one fixing element on the drive drum surface. For the purpose of aligning the right-angled triangular regions on the drive drum surface, the central axis of the convexly deltoid-shaped region is to be understood as the central axis of the region formed from the convexly deltoid-shaped region formed from the right-angled triangular regions. It thus corresponds, in each case, to the longest cathetus of a right-angled triangle. When the rectangular regions are not already connected to the convexly deltoid-shaped region, then they can be connected to it during the production of the drive drum according to the invention. This can optionally take place before fixing the convexly deltoid-shaped region or its two right-angled triangular components on the drive drum surface, or only thereafter.

In a further aspect, the invention relates to a corrugating machine that has the drive drum according to the invention. In this corrugating machine, the drive drum is arranged in such a way that the rectangular regions of the drum covering are wound around the drive drum against the rotating direction of the drive drum during the operation of the corrugating machine. In the production of corrugated cardboard, tension forces thus emerge from the edge of the drive drum in the direction of the centre of the drum. The self-tensioning effect of the drum covering is thus not exclusively limited to its thermal shrinking. Rather, the rotation of the drive drum and the simultaneous pressing of the drum covering onto the drive drum by the upper belt and the lower belt work together. The pressure of the belt is regulated by the belt tension.

SHORT DESCRIPTION OF THE DRAWINGS

Exemplary embodiments of the invention are depicted in the drawings and are explained in more detail in the description below.

EXEMPLARY EMBODIMENTS OF THE INVENTION

Figure 1:
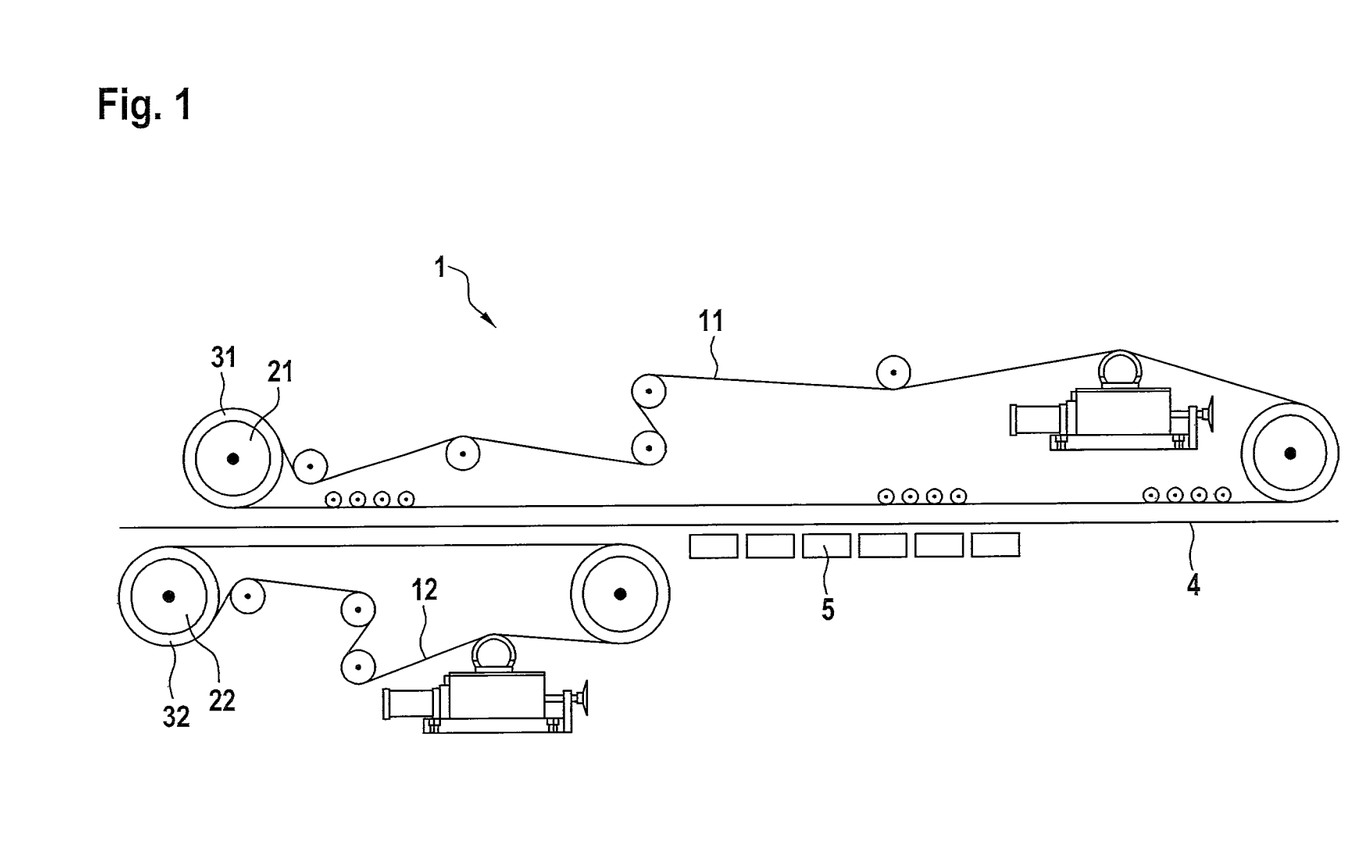
FIG. 1 shows a schematic side view of a corrugating machine according to an exemplary embodiment of the invention.

The most important components of a corrugating machine 1 according to an exemplary embodiment of the invention are depicted in FIG. 1. An upper belt 11 is driven by a first drive drum 21 that is coated with a first drum covering 31. A lower belt 12 is driven by a second drive drum 22 that is coated with a second drive covering 32. Multi-layered corrugated cardboard 4 is transported between the upper belt 11 and the lower belt 12 via heating plates 5 and the layers are thus adhered to one another. The two drive drums 21, 22 are conventional steel drums with a diameter of 90 cm and a length of 280 cm. The drum length determines the maximum width of the corrugated cardboard track 4 that can be transported in the corrugating machine 1.

The drum coverings 31, 32 each consist of a woven material that is coated on both sides by a coating material. The woven fabric has three weave layers. The thickness of the woven fabric is 5.5 mm. On one side of the woven fabric there is a 0.8 mm thick coating made of a mixture of two polydimethylsiloxanes with functional groups and excipients for the addition-crosslinking (Elastosil LR 7665 A/B by the company Wacker Chemie, Burghausen, Germany). On the opposite side of the woven material, there is a 1.0 mm thick coating made of polydimethylsiloxane with filler and excipient and triacetoxyethylsilane cross-linker (Elastosil E43 N by the company Wacker Chemie). The Shore A hardness of the drum covering is 54.

Figure 2:
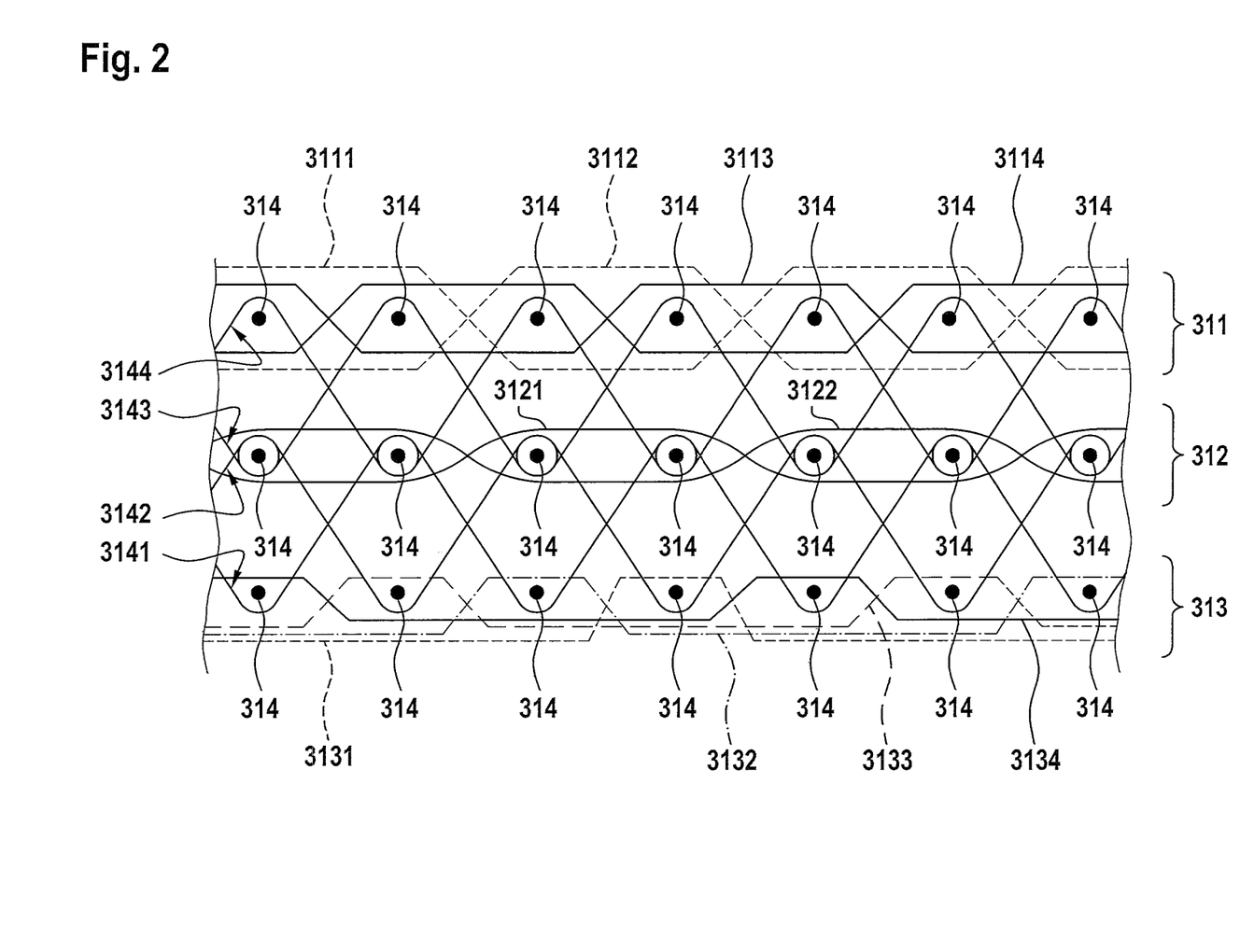
FIG. 2 shows a longitudinal section of a textile carrier material of an exemplary embodiment of the drum covering according to the invention.

The woven material of the first drum covering 31 is depicted in FIG. 2. The weft threads 314 run perpendicular to the longitudinal direction of the woven material in the woven layers 311, 312, 313, said weft threads consisting of polyester. In the upper woven layer 311, four warp threads 3111, 3112, 3113, 3114 made of a polyester/viscous mixture that run offset relative to one another are provided, which run both inwards towards the central fabric layer 312 and also outwards via at least two weft threads 314 in each case. The central fabric layer 312 has two warp threads 3121, 3122 that run offset relative to each other and are made out of polyester, said warp threads 3121, 3122 each running via two weft threads 314. The lower fabric layer 313 consists of four warp threads 3131, 3132, 3133, 3134 that each run offset relative to one another and are made of the polyester/viscous mixture that run inwards—to the central fabric layer 312—via only one weft thread 314 and outwards via at least three weft threads 314. The three fabric layers 311, 312, 313 are woven to one another by binding threads 3141, 3142, 3143, 3144 made of the polyester/viscous mixture. The binding threads are, in each case, divided into two thread groups, wherein the binding threads 3143, 3144 forming one thread group run offset relative to one another and the upper fabric layer 311 binds to the central fabric layer 312. The binding threads 3143 and 3144 are each guided alternately around a weft thread 314 in the upper fabric layer 311 and a weft thread 314 in the central fabric layer 312. In a corresponding manner, the thread group formed from the binding threads 3141 and 3142 binds the lower fabric layer 313 to the central fabric layer 312.

Figure 3:
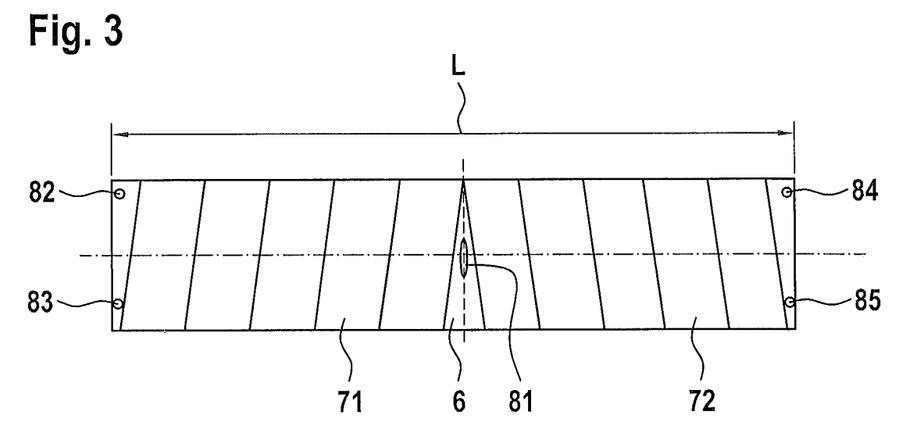
FIG. 3 shows a schematic top view onto a drive drum according to an exemplary embodiment of the invention.

FIG. 3 depicts how the first drum covering 31 is applied to the first drive drum 21. Here, the side of the first drum covering 31 coated with Elastosil LR 7665 A/B is facing towards the surface of the first drive drum 21. The first drum covering 31 has a convexly deltoid-shaped region 6 that is only partially distinguishable in FIG. 3 because of the cylindrical shape of the first drive drum 21. On the two narrow sides of this convexly deltoid-shaped region 6, two rectangular regions 71, 72 of the drum covering 31 are connected by their respective narrow sides, which are symmetrically wound out from the centre of the first drive drum 21 to their two ends such that, where the longitudinal sides of the rectangular regions each touch, peripheral grooves emerge on the first drive drum 21. The ends of the rectangular regions 71, 72 are cut off to be flush with the end of the first drive drum 21. An elongated hole 81 is arranged in the centre of the convexly deltoid-shaped region 6 and circular holes 82, 83, 84, 85 are drilled through the ends of the rectangular regions 71, 72 of the drum covering 71. Fixing rivets that are not depicted fix the first drum covering 31 on the surface of the first drive drum 21 through the elongated hole 81 and through the circular holes 82, 83, 84, 85.

Table 1 depicts which area A the first drive drum 21 has with a length L of 280 cm and a diameter d of 90 cm. From this, a minimum length x of the rectangular regions 71, 72 emerges in order to completely cover the area A. Furthermore, it is depicted for alternative smaller drum diameters of 80 cm, 70 cm, 60 cm and 30 cm for drive drums that could be exchanged for the first drive drum 21 how the drum area A and thus the minimally necessary length of the rectangular regions 71, 72 is reduced. In the present exemplary embodiment, the two drum coverings 31, 32 are, however, provided with lengths x of the rectangular regions 71, 72 which are clearly above the minimum length of 26.39 m for a drum diameter of 90 cm, such that the drum covering can be used by trimming the rectangular regions 71, 72 for each of these drum diameters d.

TABLE 1

| d [cm] | L [cm] | A [m$^2$] | x [m] |
| --- | --- | --- | --- |
| 90 | 280 | 3.958 | 26.39 |
| 80 | 280 | 3.519 | 23.46 |
| 70 | 280 | 3.079 | 20.53 |
| 60 | 280 | 2.639 | 17.59 |
| 30 | 280 | 1.319 | 8.79 |

Figure 4:
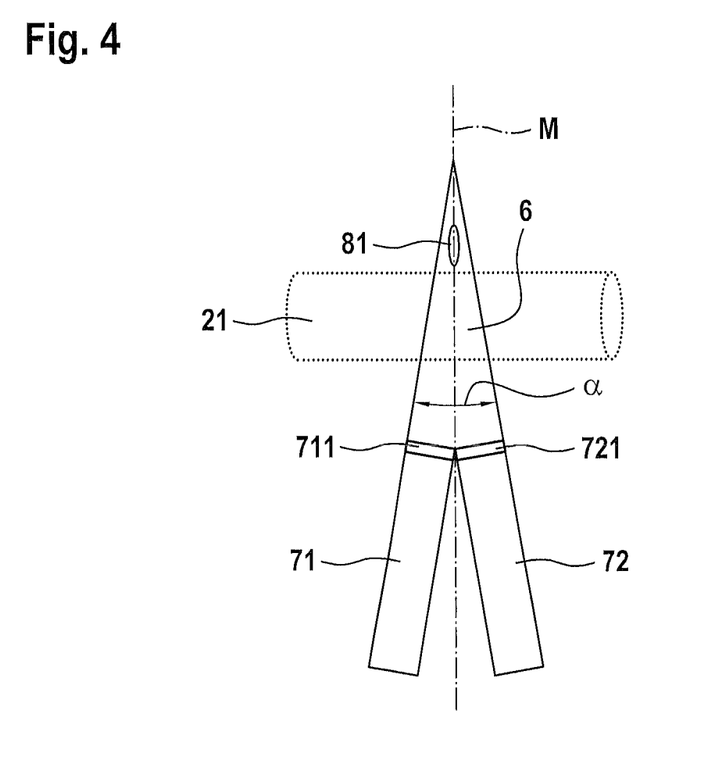
FIG. 4 shows a schematic top view onto a drum covering according to an exemplary embodiment of the invention.

FIG. 4 shows a view of the first drum covering 31 which is still not yet wound onto the first drive drum 21. Here, the convexly deltoid-shaped region 6 is completely depicted. The rectangular regions 71, 72 are each only depicted shortened. These rectangular regions 71, 72 are fixed by means of clamps 711, 721 on the convexly deltoid-shaped region 6. This fixing takes place on the two shorter sides of the convexly deltoid-shaped region 6. Its two longer sides form an angle α which determines the gradient with which the rectangular regions 71, 72 form their spirals around the first drive drum 21. The angle α is halved by the central axis M of the convexly deltoid-shaped region 6. According to formula 1, depending on the circumference U of the first drive drum 21, in each case an optimal angle α emerges. The circumference U can thus be calculated from the diameter d of the first drive drum 21. The angles α for the drum diameter mentioned in table 1 are tabulated in table 2. Here, the width b of the rectangular regions is 15 cm.

TABLE 2

| d [cm] | U [cm] | α [°] |
| --- | --- | --- |
| 90 | 282.7 | 3.0 |
| 80 | 251.3 | 3.4 |
| 70 | 219.9 | 3.9 |
| 60 | 188.5 | 4.6 |
| 30 | 94.2 | 9.1 |

Figure 5:
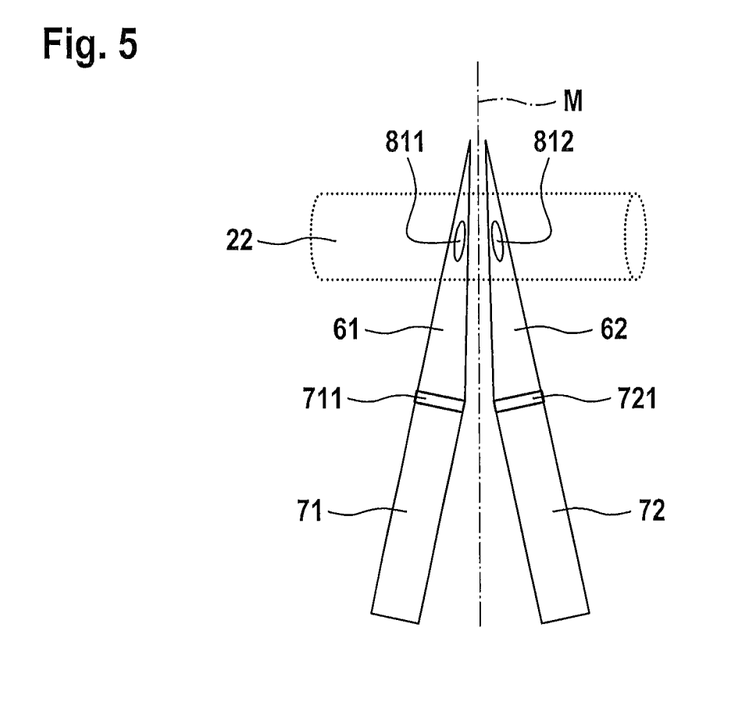
FIG. 5 shows a schematic top view onto a drum covering according to a different exemplary embodiment of the invention.

FIG. 5 shows a depiction of the second drum covering 32 in an analogous depiction relative to FIG. 4. However, the convexly deltoid-shaped region is not formed here as one piece. Rather, it consists of two right-angled triangular covering pieces 61, 62. These can be part of a set in order to assemble the second drum covering 32 on the site of the corrugating machine 1. Each of the right-angled triangular covering pieces 61, 62 has, in each case, an elongated hole 811, 812 in order to be able to fix it separately on the surface of the second drive drum 22. Even when the two right-angled triangular covering pieces 61, 62 are depicted spaced apart from one another for a better illustration, they are still joined to each other along their hypotenuses in such a way that they form the convex deltoid depicted in FIG. 4. Their hypotenuses thus then each lie on the central axis of the convex deltoid. As can be seen in the depiction in FIG. 6, the hypotenuse length corresponds to the circumference U of the second drive drum 22. The angle that is defined by the hypotenuse and the longer cathetus a of the right-angled triangular region 62 corresponds to half of angle α.

Figure 6:
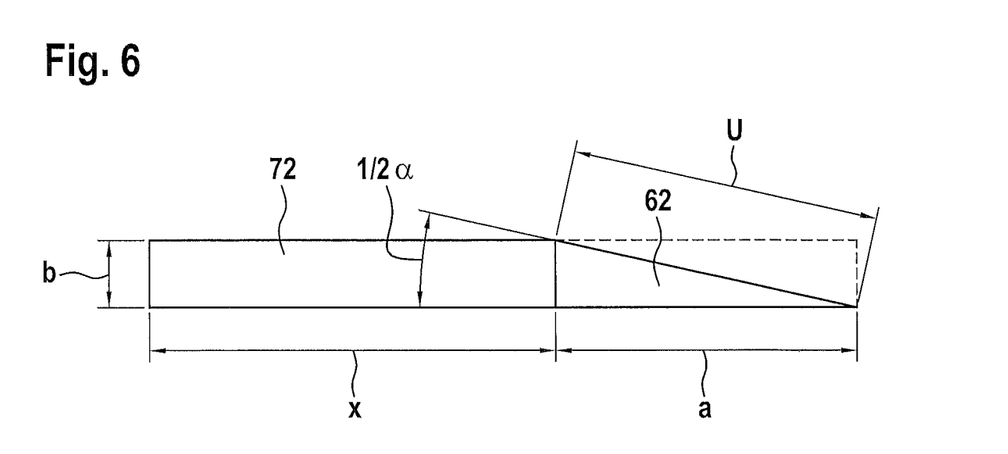
FIG. 6 shows a part of the drum covering according to FIG. 4 in a schematic top view.
Figure 7:
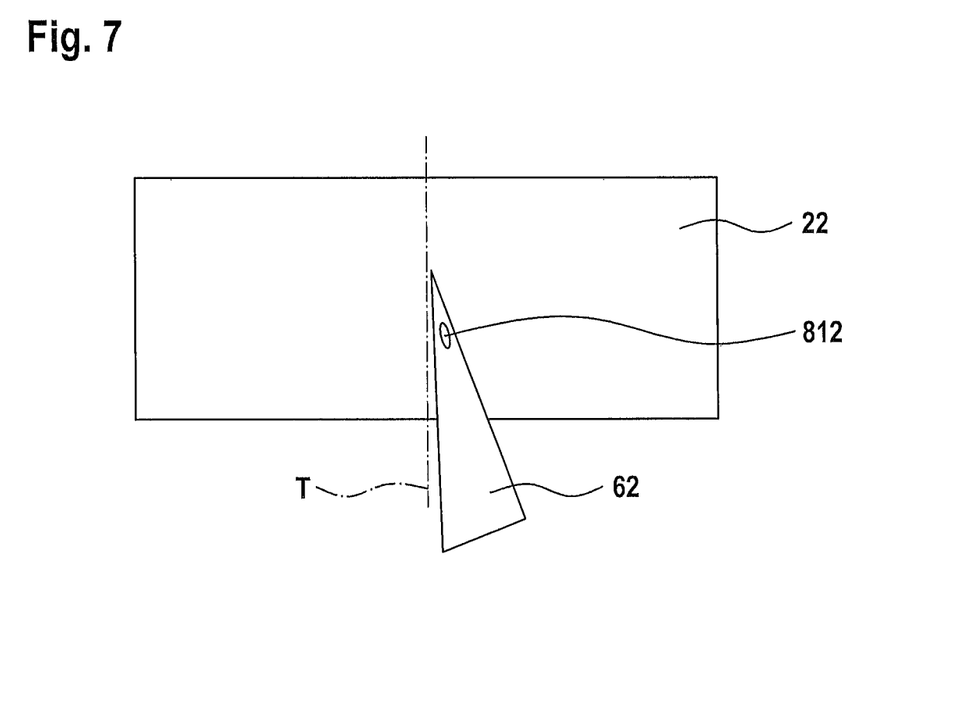
FIG. 7 schematically shows the arrangement of a right-angled triangular region of a drum covering according to an exemplary embodiment of the invention onto a drive drum.
Figure 8:
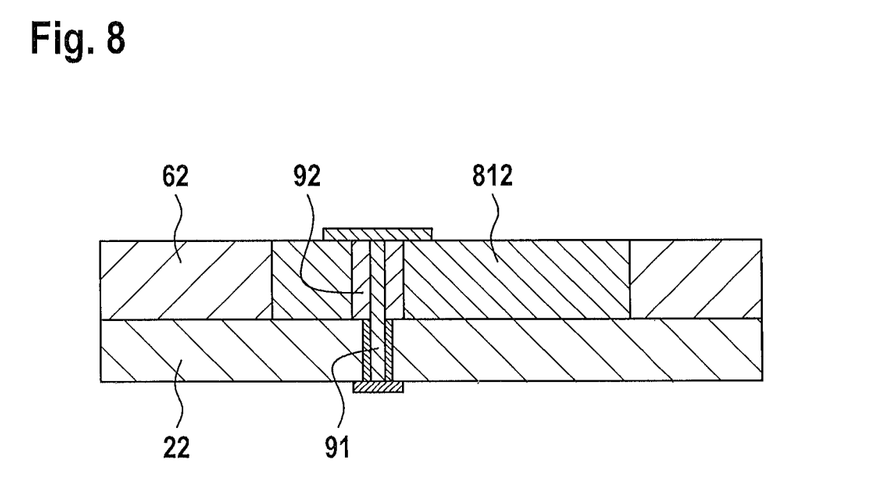
FIG. 8 in a schematic section view, shows the fixing of the right-angled triangular region of the drum covering according to FIG. 6 onto a drive drum surface.

To arrange the second drum covering 32 on the second drive drum 22, firstly one of the right-angled triangular covering pieces 62 is arranged on the drive drum surface in such a way that its hypotenuse is on the circumferential central axis T of the second drive drum 22. A hole is drilled into the drive drum surface through which a fixing rivet 91 is guided that connects the right-angled triangular covering piece 62 to the drive drum surface through the elongated hole 812. Here, a spacer 92 is arranged in the elongated hole 812 between the head of the fixing rivet 91 and the drive drum surface around the fixing rivet in such a way that it is able to be moved in the elongated hole 812. This is depicted in FIG. 6.

Figure 9:
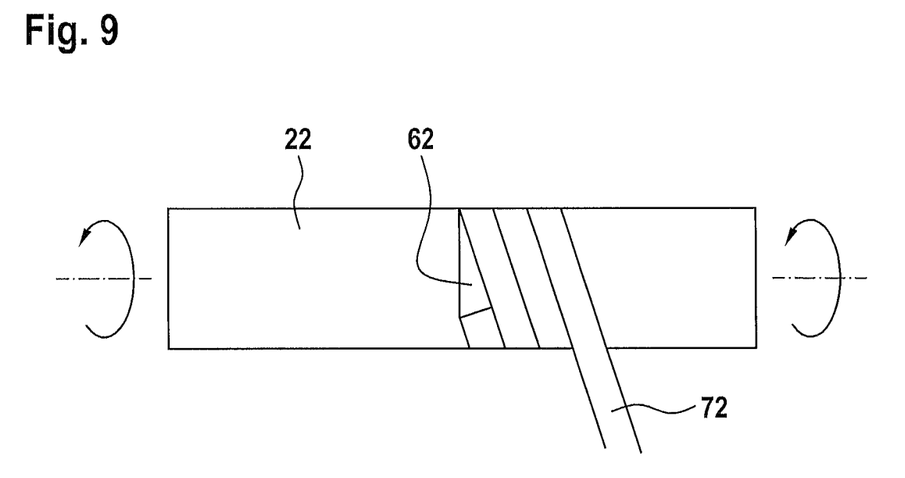
FIG. 9 shows how a part of a drum covering according to an exemplary embodiment of the invention is wound onto a drive drum.
Figure 10:
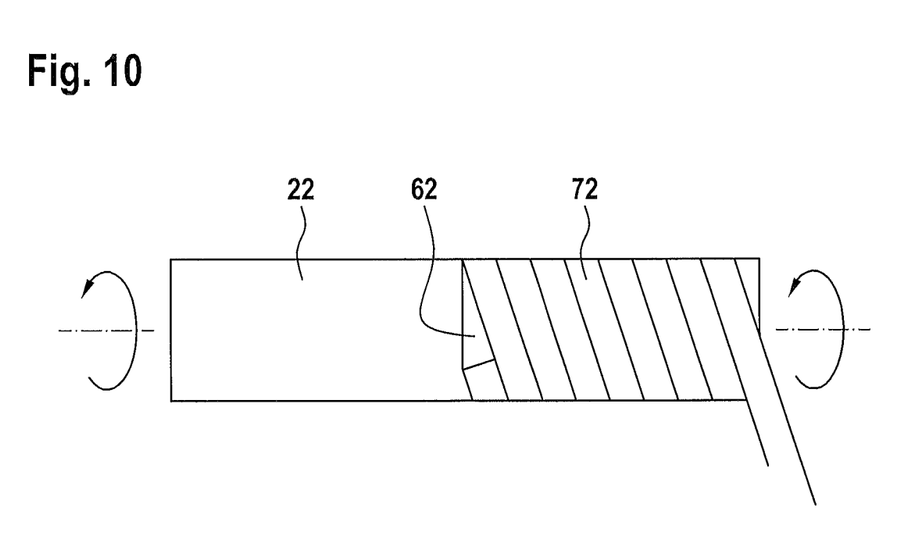
FIG. 10 shows a further winding of the drum covering part from FIG. 8.
Figure 11:
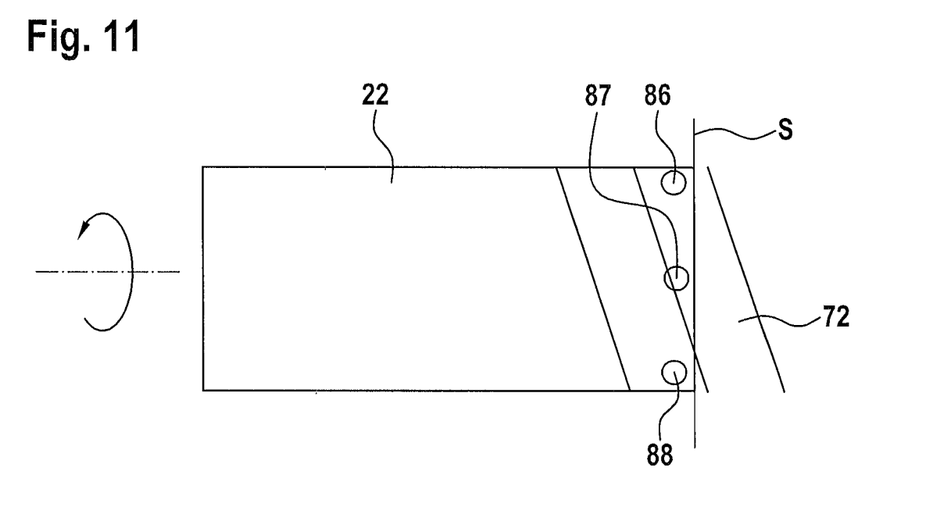
FIG. 11 shows how a part of the drum covering is cut on the end of a drive drum and is fixed.

After the rectangular region 72 of the drum covering 32 belonging to this right-angled triangular covering piece 62 has been clamped onto this, the rectangular region 72 can be wound around the second drive drum 22 at an angle predetermined by the angle α. To do so, the second drive drum 22 is rotated in the corrugating machine 1 against the rotational direction of the second drive drum 22 during the corrugated cardboard production. Winding up the rectangular region 72 is depicted in FIGS. 9 and 10. As soon as the end of the second drive drum 22 has been reached when unwinding it, the protruding remainder of the rectangular region 72, as depicted in FIG. 11, are cut along a cutting edge S. Subsequently, several circular holes 86, 87, 88 are drilled around the drive drum circumference through the rectangular region 72 and through the drive drum surface. Further fixing rivets formed as blind-head rivets are guided through these circular holes 86, 87, 88, said fixing rivets fixing the rectangular region 72 on the drive drum surface. Subsequently, this process is repeated with a further right-angled triangular covering piece 61 and a further right-angled covering piece 71 for the other half of the second drive drum 22 until it is completely coated with the second drum covering 32. Here, the two right-angled covering pieces 61, 62 form a convexly deltoid-shaped region in the centre of the second drive drum 22.

Figure 12:
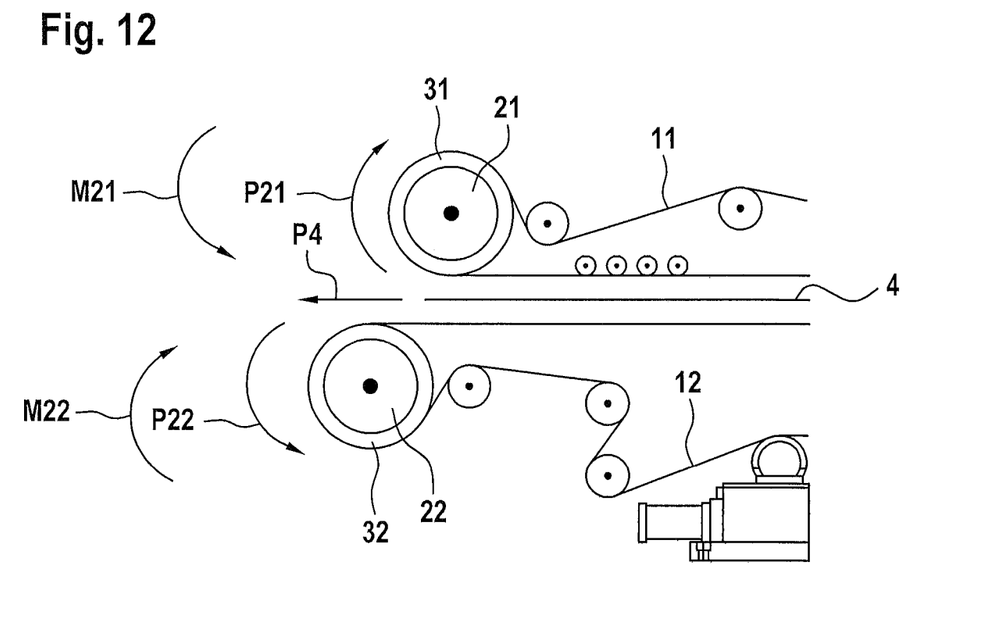
FIG. 12 shows a section from the corrugating machine according to FIG. 1.

FIG. 12 depicts in which assembly directions M21, M22 the first drive drum 21 and the second drive drum 22 are rotated when applying the drum coverings 31, 32. In the later production of corrugated cardboard, the corrugated cardboard 4 is moved in the production direction P4 by the drive drums 21, 22 being rotated in the production directions P21, P22 opposed to the assembly directions M21, M22. Here, the drum coverings 31, 32 heat up, starting from a room temperature of 20° C., by 80° C. to 140° C., such that operating temperatures ranging from 100° C. to 160° C. can be achieved. In a 6 cm wide piece, one of the drum coverings 31, 32 has been simulated across a measuring section of 20 cm with a pre-tensioning force of 50 N at room temperature which influences this temperature increase of the tensioning force F of the drum coverings 31, 32. In table 3 it is tabulated for different temperatures T, along with this tensioning force F, by which distance s the sample is shortened at the respective temperature and which percentile longitudinal reduction Δl this corresponds to. All tabulated thermal shrinkages were completely reversible.

TABLE 3

| T [° C.] | F [kg] | s [mm] | Δl [%] |
| --- | --- | --- | --- |
| 100 | 5.0 | 0.10 | 0.02 |
| 120 | 5.0 | 0.25 | 0.06 |
| 135 | 5.2 | 0.50 | 0.12 |
| 145 | 5.5 | 1.00 | 0.24 |
| 160 | 6.0 | 2.00 | 0.49 |

When the drum coverings 31, 32 have to be removed again from the drive drums 21, 22 because of wear, then this can be achieved in a simple manner by all fixing rivets being loosened after cooling the drive drums 21, 22 and removing the upper belt 11 and the lower belt 12 from the drive drums 21, 22, and the drum coverings 31, 32 being unwound from the drive drums 21, 22. Subsequently, an immediate recovering with fresh drum coverings 31, 32 is possible.

The invention claimed is:

1. A drum covering (31, 32) for a drive drum (21, 22) in a corrugating machine (1), having a textile carrier material that reversibly shrinks when heated up, said carrier material being coated on at least one side with a coating material, wherein the drum covering (31, 32) has two rectangular regions (71, 72) that are each connected to a convexly deltoid-shaped region (6) on a narrow side.

2. The drum covering (31, 32) according to claim 1, wherein the textile carrier material is coated on both sides with the coating material.

3. The drum covering (31, 32) according to claim 1, wherein the reversibly shrinking textile carrier material shrinks when heated up by at least 80° C. by at least 0.01% in the longitudinal direction.

4. The drum covering (31, 32) according to claim 1, wherein the reversibly shrinking textile carrier material contains polyester and/or viscose.

5. The drum covering (31, 32) according to claim 1, wherein the coating material reversibly shrinks when heated up.

6. The drum covering (31, 32) according to claim 1, wherein the coating material is selected from the group consisting of rubbers, silicones, polyurethanes and mixtures of these.

7. The drum covering (31, 32) according to claim 1, wherein the drum covering has a Shore A hardness of more than 50.

8. A set for producing a drum covering (31, 32), comprising two rectangular covering pieces (71, 72) and a convexly deltoid-shaped covering piece (6), wherein all covering pieces (6, 71, 72) have a textile carrier material that reversibly shrinks when heated up, said carrier material being coated on at least one side with a coating material.

9. The set according to claim 8, further comprising several triangular covering pieces (61, 62) that are designed to be joined to a convexly deltoid-shaped region (6) of the drum covering (31, 32), wherein all covering pieces (61, 62, 71, 72) have a textile carrier material that reversibly shrinks when heated up, said carrier material being coated on at least one side with a coating material.

10. A drive drum (21, 22) for a corrugating machine (1) having a drum covering (31, 32), having a textile carrier material that reversibly shrinks when heated up, said carrier material being coated on at least one side with a coating material, wherein two rectangular regions (71, 72) of the drum covering (31, 32) are wound around the drive drum (21, 22) in spiral-shaped manner and are fixed on a drive drum surface by fixing elements (91), such that in each case an end of each rectangular region (71, 72) of the drum covering borders a side of a convexly deltoid-shaped positioning region of the drive drum arranged centrally in the drive drum surface.

11. The drive drum (21, 22) according to claim 10, wherein the convexly deltoid-shaped region (6) of the drum covering (31, 32) is fixed in the convexly deltoid-shaped positioning region by means of at least one fixing element (91) on the drive drum (21, 22) and the rectangular regions (71, 72) of the drum drive (31, 32) are fixed on their ends in each case by at least one further fixing element (91) on the drive drum surface.

12. The drive drum (21, 22) according to claim 11,
wherein the convexly deltoid-shaped region of the drum covering has first and second sides longer than a third side of the convexly deltoid-shaped region of the drum covering;
wherein an angle a formed by the first and second sides of the convexly deltoid-shaped region (6) of the drum covering (31, 32) emerges from the following formula $$\alpha = 2 \cdot \arcsin\frac{b}{U}$$

wherein b is the width of the rectangular regions of the drum covering (31, 32) and U is the circumference of the drive drum (21, 22).

13. The drive drum (21, 22) according to claim 11, wherein the drum covering (31, 32) is pre-tensioned by a pre-tensioning force ranging from 10 N to 100 N.

14. The drive drum (21, 22) according to claim 11, wherein the at least one fixing element (9) which fixes the convexly deltoid-shaped region (6) of the drum covering (31, 32) on the drive drum (21, 22) is a fixing rivet that is arranged in an elongated hole (8) passing through the convexly deltoid-shaped region (6).

15. A method for producing a drive drum (21, 22), comprising the following steps:
arranging a convexly deltoid-shaped region (6) of a drum covering (31, 32) on a drive drum (21, 22), wherein the central axis (M) of the convexly deltoid-shaped region (6) is arranged along the circumferential central axis (T) of the drive drum (21, 22),
fixing the convexly deltoid-shaped region (6) of the drum covering (31, 32) on a drive drum surface by means of at least one fixing element (9),
rotating the drive drum (21, 22), wherein rectangular regions (71, 72) of the drum covering (31, 32) are wound around the drive drum (21, 22) in a spiral-shaped manner,
cutting the rectangular regions (71, 72) on ends of the drive drum (21, 22), and
fixing the ends of the rectangular regions (71, 72) on the drive drum surface by means of further fixing elements (9).

16. The method according to claim 15, wherein the convexly deltoid-shaped region (6) is made up of two right-angled triangular regions (61, 62), wherein each right-angled triangular region (61, 62) is fixed on the drive drum surface by at least one fixing element (9).

17. The method according to claim 15, wherein the rectangular regions (71, 72) are fixed by means of connecting elements (9) on the convexly deltoid-shaped region (6).

18. A corrugating machine (1), having at least one drive drum (21, 22),
wherein the at least one drive drum has a drum covering (31, 32), having a textile carrier material that reversibly shrinks when heated up, said carrier material being coated on at least one side with a coating material, wherein first and second rectangular regions (71, 72) of the drum covering (31, 32) are wound around the at least one drive drum (21, 22) in spiral-shaped manner and are fixed on the drive drum surface by fixing elements (91), such that in each case an end of each rectangular region (71, 72) of the drum covering borders a side of a convexly deltoid-shaped positioning region of the at least one drive drum arranged centrally in the drive drum surface;
wherein the first and second rectangular regions (71, 72) of the drum covering (31, 32) are wound around the drive drum against a rotational direction of the drive drum (21, 22) when the corrugating machine (1) is in operation.

* * * * *